United States Patent

Kurz et al.

[11] Patent Number: 5,911,230
[45] Date of Patent: Jun. 15, 1999

[54] APPARATUS FOR TREATING AN ARTICLE

[75] Inventors: Roland Kurz, Gaildorf; Erwin Merz, Waiblingen; Marc Geiselhart, Weil der Stadt; Arnold Bernhof, Esslingen; Dieter Bernlöhr, Schorndorf, all of Germany

[73] Assignee: Alfred Karcher GmbH & Co., Winnenden, Germany

[21] Appl. No.: 08/994,692

[22] Filed: Dec. 19, 1997

Related U.S. Application Data

[63] Continuation of application No. PCT/EP96/02458, Jun. 6, 1996.

[30] Foreign Application Priority Data

Jun. 23, 1995 [DE] Germany .......................... 195 22 881

[51] Int. Cl.⁶ .................................................. B08B 15/00
[52] U.S. Cl. ...................... 134/95.2; 134/99.1; 134/123; 134/199
[58] Field of Search .................... 134/123, 198, 134/149, 94.1, 95.2, 99.1; 239/104, 273, 159, 164, 165, 166; 118/DIG. 7, 309, 326, 323; 454/55

[56] References Cited

U.S. PATENT DOCUMENTS

| | | | |
|---|---|---|---|
| 2,965,305 | 12/1960 | Glazer | 239/273 X |
| 3,804,332 | 4/1974 | Welch | 239/77 |
| 4,848,383 | 7/1989 | Buhler . | |
| 5,098,023 | 3/1992 | Burke | 239/273 |
| 5,447,574 | 9/1995 | Inoue | 134/18 |
| 5,630,435 | 5/1997 | Brouchard et al. | 134/68 |
| 5,688,323 | 11/1997 | Kane et al. | 118/326 |

FOREIGN PATENT DOCUMENTS

WO 89/06614  7/1989  WIPO .

*Primary Examiner*—Kevin Weldon
*Attorney, Agent, or Firm*—Barry R. Lipsitz; Ralph F. Hoppin

[57] ABSTRACT

In an apparatus for treating an article comprising a treatment bridge with a head beam which is arranged above the article and two side beams which are arranged at the sides of the article and extend transversely to the head beam, and delivery devices which are arranged on the beams for respectively directing at least one treating agent at the article, in order to improve the transportability of the bridge, it is proposed that the side beams of the bridge be pivotable from a working position in which they stand transversely to the head beam to a resting position in which they are arranged parallel to the head beam.

15 Claims, 10 Drawing Sheets

FIG. 13 ized as U-shaped, rigid

APPARATUS FOR TREATING AN ARTICLE

This application is a continuation of International PCT Application No. PCT/EP96/02458 filed on Jun. 6, 1996.

BACKGROUND OF THE INVENTION

The invention relates to an apparatus for treating an article comprising a treatment bridge with a head beam arranged above the article and two side beams arranged at the sides of the article and extending transversely to the head beam, and delivery devices arranged on the beams for respectively directing at least one treating agent at the article.

Such treatment bridges are widely used for cleaning articles, for example, for cleaning motor vehicles. In this case, the bridges are used as fixed components of a washing installation. As a rule, they are employed as U-shaped, rigid structural units and are moved relative to the motor vehicle to be cleaned, for example, on rails.

Such bridge assemblies for treating articles are used stationarily. Owing to the bulky structure of the bridges, mobile employment is hardly possible. Even transportation of a large U-shaped bridge would cause quite considerable difficulties.

SUMMARY OF THE INVENTION

The object of the invention is to so design a generic apparatus that it is transportable in a space-saving way.

This object is accomplished in accordance with the invention in an apparatus of the kind described at the outset by the side beams of the bridge being pivotable from a working position in which they stand transversely to the head beam to a resting position in which they are arranged parallel to the head beam.

This makes it possible to fold up the bridge in a space-saving way and to convert it into a package whose dimensions are substantially determined by the head beam. Such a structural unit is easily transportable, for example, on the semi-trailer of a semi-trailer truck tractor and can, therefore, be conveyed without any great difficulties to a desired location at which the bridge is used again in a fully functioning way by unfolding the side beams.

It is particularly advantageous for the side beams and the head beam to be offset in relation to one another transversely to the longitudinal direction of the head beam so that the side beams and the head beam lie alongside one another in the resting position. A particularly low structural height of the bridge in the resting position is thereby achievable.

In a preferred embodiment the head beam is mounted for vertical adjustment on the bridge.

Furthermore, the side beams can be mounted on the bridge for adjustment in the longitudinal direction of the head beam in the working position. This configuration makes it possible to adapt the bridge to the size of the articles to be treated. The head beam and the side beams can be adjusted such that independently of the size of the article to be treated, the spacing between head beam and side beams, on the one hand, and the article to be treated, on the other hand, is chosen substantially the same.

In a preferred embodiment the bridge comprises a frame on which the head beam and the side beams are mounted.

The frame can preferably accommodate the head beam and the side beams in their resting position so that the frame simultaneously forms a casing for the structural elements of the bridge when these are pivoted into the resting position.

The head beam can be mounted on the frame for vertical adjustment by an adjusting drive means.

It is advantageous for a support which is pivotally mounted on the bridge to be allocated to each side beam.

This mounting can, in principle, also be effected on the head beam, but it is advantageous for the support to be pivotally mounted on the frame.

Furthermore, it is expedient for the side beam to be adjustably mounted on the support such that its spacing from the support is variable via an adjusting drive means. The adjusting drive means can be formed by, for example, hydraulic piston cylinder units. In a preferred embodiment, the adjusting drive means of the head beam and/or the side beams comprise scissors-type rod mechanisms.

In a preferred embodiment the head beam and/or the side beams are connected to a fan via gas supplying channels of variable length. It is advantageous for the gas supplying channels to be formed in their area of variable length by pipe sections guided telescopingly in one another in the direction of the adjustability of the head beam and the side beams, respectively. This configuration makes it possible to establish a gas-tight connection with the fan even with head and side beams whose position is variable.

In a preferred embodiment the head beam and/or the side beams comprise two chambers extending parallel over the length thereof, with one chamber being connected to a fan and having gas outlet openings, and supply lines for liquid agents leading to outlet openings for the liquid agents running in the other chamber.

The described treatment apparatus can constitute in the conventional way a washing installation which, for example, acts upon the articles to be treated with water, with cleaning chemicals, with conservation agents or with drying air. However, treatments with other gases or liquid chemicals can also be provided, for example, for applying decontaminating liquids to articles and vehicles.

The following description of preferred embodiments of the invention serves in conjunction with the drawings to explain the invention in greater detail.

BRIEF DESCRIPTION OF THE DRAWINGS

FIG. 9 a plan view of the bridge of FIG. 7 with side beams pivoted in;

FIG. 11 a view similar to FIG. 10 with side beams driven in;

DETAILED DESCRIPTION OF THE INVENTION

The bridge according to the invention will be explained hereinbelow in combination with a drivable crane which carries the bridge in operation. This is a particularly preferred embodiment as the crane enables not only displacement of the bridge in operation but also loading of the bridge itself. It will, however, be understood that the described, collapsible bridge can also be employed without such a crane. In principle, it is possible to design a collapsible bridge as a mobile apparatus, for example, the side beams can carry chassis at their free ends. It is, in principle, also possible to set up such a collapsible bridge stationarily after it has been swung out and to move the article to be cleaned relative to the bridge.

Figure 1:
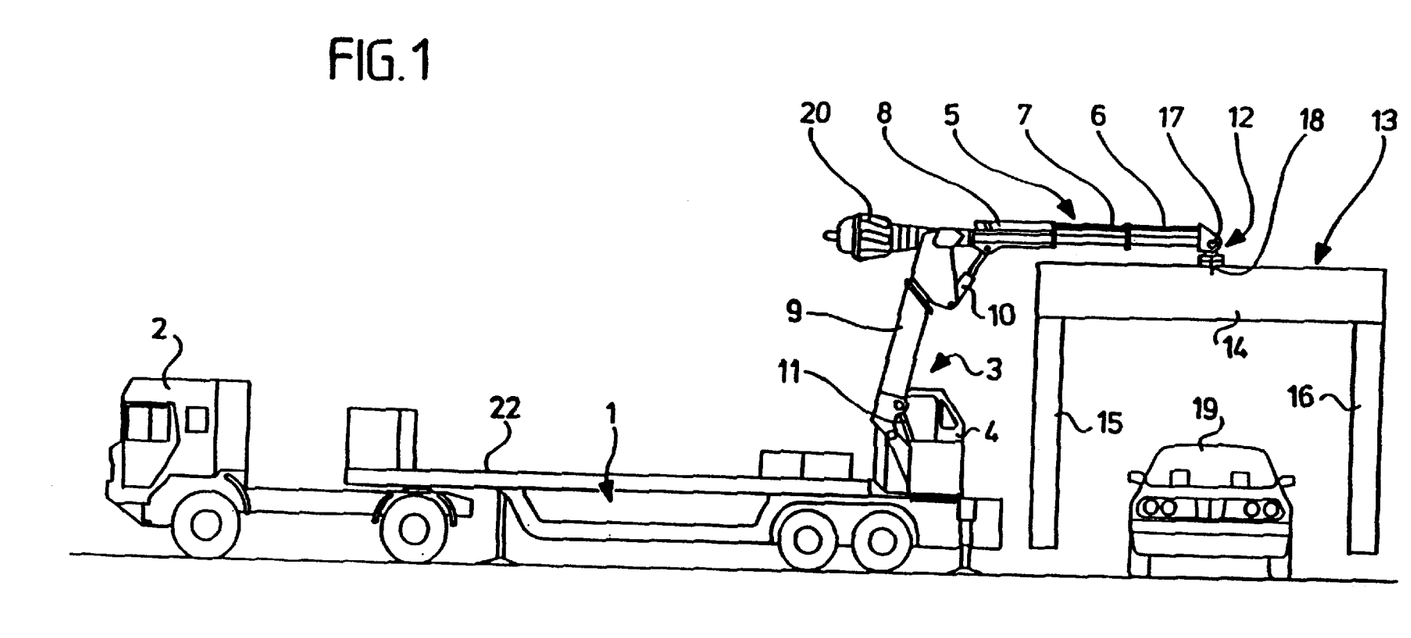
FIG. 1 a schematic side view of a vehicle with a crane carrying a bridge.

In the illustrated embodiment, a crane 3 is arranged on the semi-trailer 1 of a semi-trailer truck tractor 2. The crane comprises a driver's cab 4 and a multi-part crane arm 5 whose parts 6, 7, 8 are mounted telescopingly on one another so the length of the crane arm 5 is adjustable. The parts 6, 7, 8 are articulatedly connected to a supporting foot 9, and the angle between the crane arm 5 and the supporting foot 9 can be adjusted by a hydraulically actuatable piston cylinder unit 10 so the inclination of the crane arm 5 is thereby likewise freely selectable. The supporting foot 9 itself can also be mounted for pivotal movement on the crane 3 so its inclination is adjustable via a further piston cylinder unit 11.

At the free end of the crane arm 5, a bridge 13 is held on the crane arm 5 via a connecting head 12. The bridge comprises a crossbeam 14 and side members 15, 16 projecting vertically downwards therefrom.

The connecting head 12 comprises a horizontal axis of rotation 17 and a vertical axis of rotation 18, and by drive means, not illustrated in the drawings, the connecting head 12 is adjustable about both the axis of rotation 17 and the axis of rotation 18 so that it is thereby possible to adjust the position of the bridge 13 relative to the crane arm 5 in the desired manner. The drive means for the horizontal axis of rotation 17 and the vertical axis of rotation 18 are activated by a control means of the crane and can be fixed in a reached position so that when the drive means of the axes of rotation 17 and 18 are at a standstill the crane arm 5 practically forms a rigid body with the bridge 13.

The bridge 13 forms a treatment device for an article 19, for example, a vehicle, over which the bridge 13 spans. To this end, the bridge 13 carries in both the crossbeam 14 and the side members 15, 16 delivery devices for certain agents, for example, for cleaning liquids, cleaning chemicals, conservation chemicals or drying air, which upon relative movement of the bridge 13 and the article 19 can be applied to all surfaces of the article, as is known per se with bridges of installations for washing motor vehicles. The means for supplying the individual agents to be delivered via the bridge can be arranged on the crane 3 or on the semi-trailer 1, for example, the crane 3 can carry a fan 20 for generating streams of drying air. For supplying liquid agents, flexible hose lines can be laid in the crane arm 5. These are not shown separately in the drawings.

For an article to be treated by the bridge 13, it is necessary to displace the article 19 and the bridge 13 relative to each other. In the simplest case, this can be carried out with the bridge 13 being held stationary and the article being moved through under the bridge, in the case of a vehicle, for example, by self-propulsion.

In many cases, it is, however, desirable to leave the article stationary and to effect the relative movement by moving the bridge along the article, i.e., along a work path which covers the whole of the article.

This is achieved by a corresponding movement of the crane 3 which takes the bridge along with it and moves it along the work path.

Various possibilities for effecting such displacement of the bridge 13 along the work path by movement of the crane are schematically illustrated in FIGS. 3 to 6.

Figure 3:
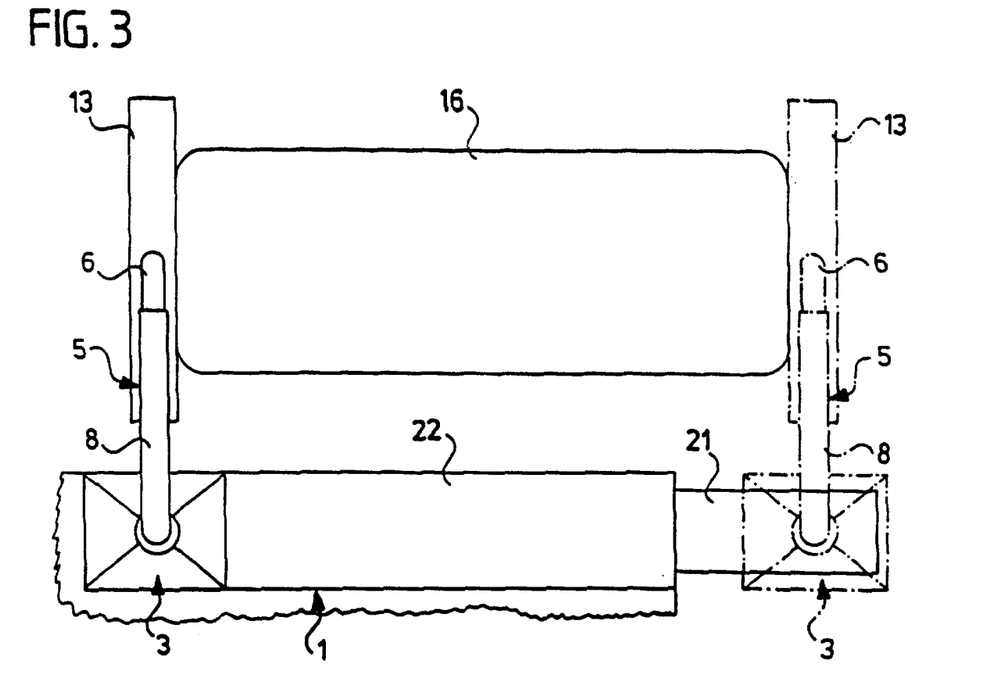
FIG. 3 a schematic plan view of a vehicle with a crane drivable along the vehicle.

In the embodiment of FIG. 3, for example, the crane 3 is drivable along the semi-trailer 1 by means of a slide. In order to increase the length of this path of travel in the semi-trailer 1 according to FIG. 3, the semi-trailer 1 carries an extension 21 on one side thereof. This can be, for example, a section of rail fitted onto the semi-trailer 1 for the crane 3.

Owing to the drivability of the crane 3 on the semi-trailer 1, it is possible, with the crane arm 5 immobilized, to displace the bridge 13 alongside the semi-trailer 1 through a distance parallel to itself which corresponds to the length of the path of travel of the crane 3 on the semi-trailer 1. In this case, it is advantageous to adjust the bridge 13 transversely to the direction of displacement and to leave it in this position.

As in all other cases described hereinbelow, it is possible, by changing the length of the crane arm 5 and the inclination of the crane arm 5 and by adjusting the connecting head 12, to displace the bridge 13, prior to commencement of the treatment operation, to a position which corresponds to the position of the article to be treated so that it is not necessary to move the article to be treated and the semi-trailer 1 to a precisely determined relative position, precise adjustment being possible by the crane.

A precondition of an arrangement as shown in FIG. 3 is that the crane be able to be driven freely along the semi-trailer 1. The semi-trailer 1 must be designed for this. Also, the path of travel of the crane on the semi-trailer 1 must be free for the operation.

Figure 4:
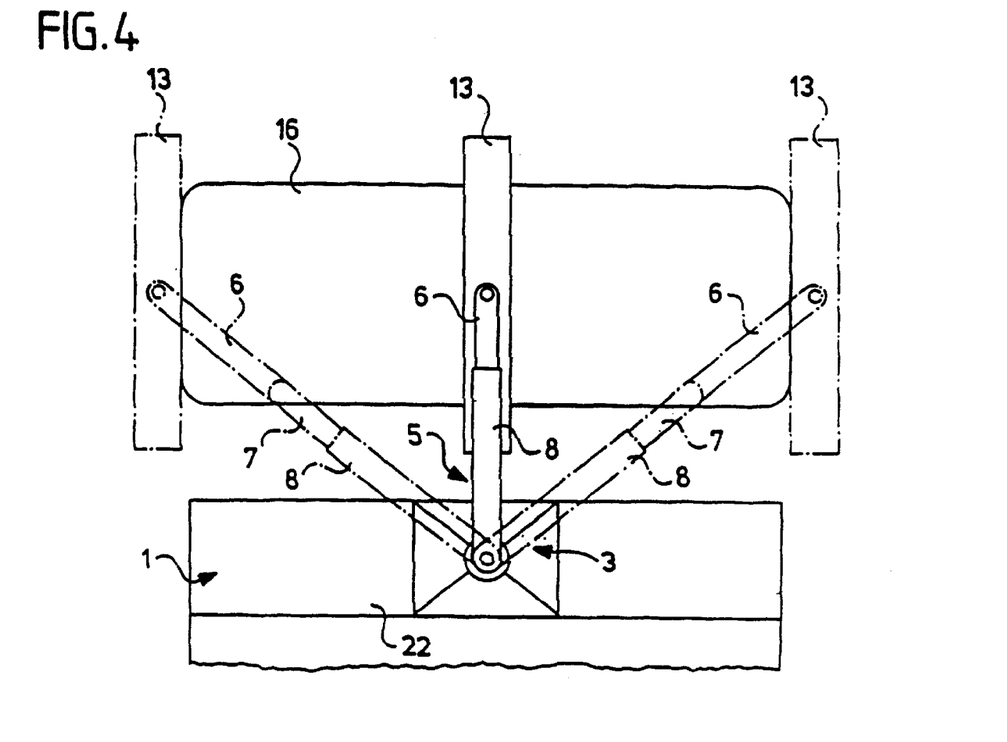
FIG. 4 a schematic plan view of a vehicle with a crane arranged stationarily and rotatably thereon with an arm of adjustable length.

In an embodiment as shown in FIG. 4, these preconditions are not necessary. Herein, the crane 3 is arranged stationarily on the semi-trailer 1, displacement of the bridge 13 is carried out merely by changing the length of the crane arm 5 and by simultaneously rotating the crane 3 about its vertical axis of rotation. In this way, too, it is possible to displace the bridge along a rectilinear work path, however, the adjustment of the length of the crane arm and the pivotal movement of the crane 3 must be carried out in coordination with one another. Furthermore, in this embodiment it is additionally necessary to adjust the connecting head 12 during the entire displacement of the bridge so as to ensure that the bridge 13 will be moved parallel to itself. The control means of the crane provides for such coordinated movement in which the length of the crane arm, the rotation of the crane and the rotation of the connecting head are respectively coordinated with one another.

In the embodiment of FIG. 4, the crane 3 is arranged at the center of the semi-trailer 1. With this configuration, the work path runs parallel to the semi-trailer 1.

Figures 5, 6:
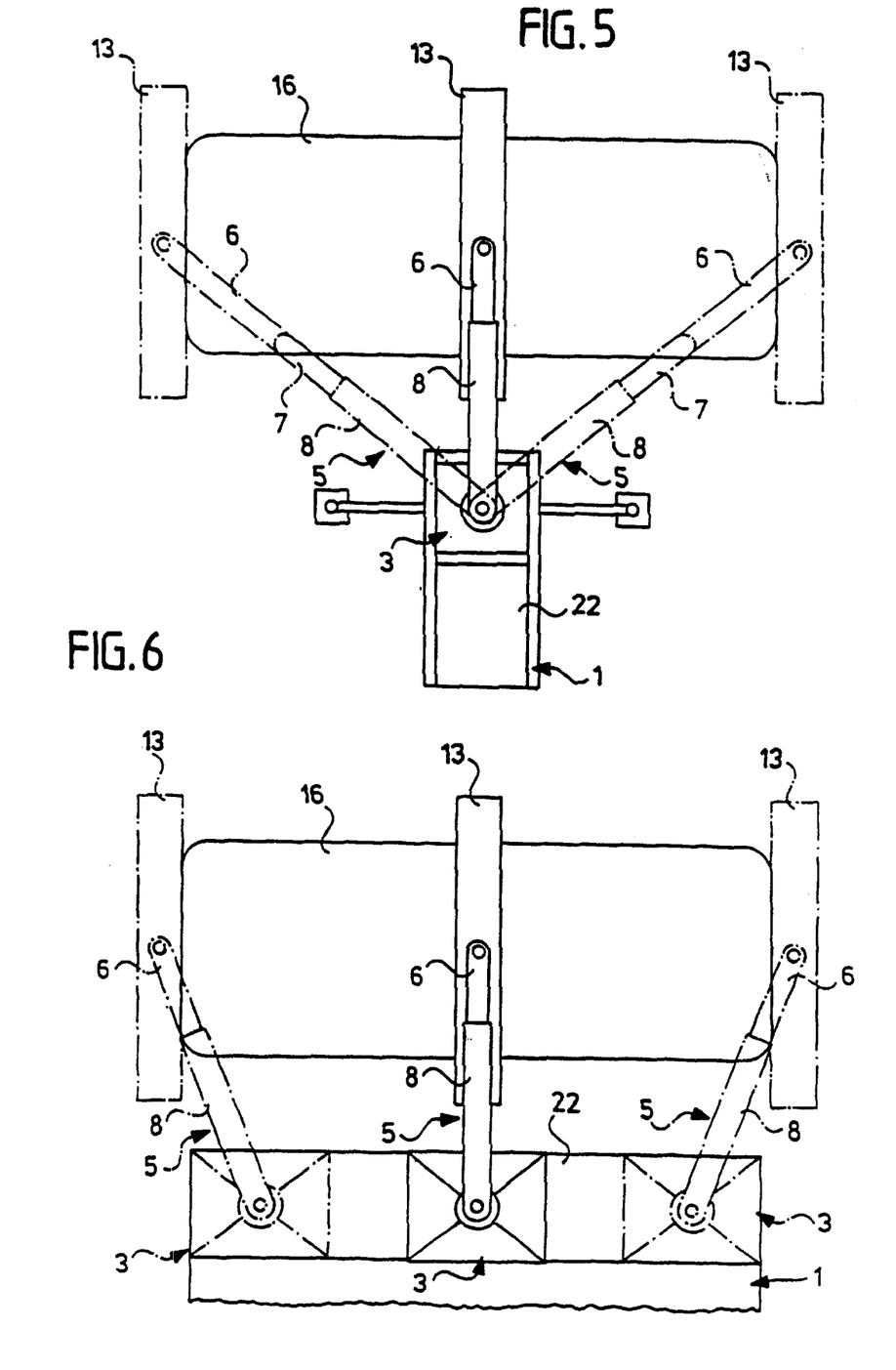
FIG. 5 a view similar to FIG. 4 with a crane arranged at one end of the vehicle.
FIG. 6 a view of a vehicle with a crane arranged for longitudinal displacement and rotation on the vehicle with an arm of increasable length.

A similar embodiment is shown in the assembly of FIG. 5. This differs from that of FIG. 4 solely in that the crane 3 is arranged at one end of the semi-trailer 1, and the semi-trailer 1 is, therefore, preferably arranged perpendicularly to the work path. The work path thus lies behind the semi-trailer 1 and runs transversely to the longitudinal direction thereof.

In the embodiment of FIG. 6, the movements possible in the embodiments of FIG. 3, on the one hand, and FIGS. 4 and 5, on the other hand, are combined with one another. The crane 3 is arranged on the semi-trailer 1 so it can be driven thereon, but, in this case, an extension 21 of the semi-trailer 1 is missing, i.e., the path of travel of the crane 3 along the semi-trailer 1 is relatively short. In order to increase the length of this path of travel, the bridge is moved by the crane 3 further along the work path by rotation of the crane 3 about its vertical axis and by a coordinated change in the length of the crane arm 5 once the crane 3 has reached its end positions along a path of travel of its own. A central phase of the work path in which the crane 3 moves the bridge solely by its own travel motion, with this central phase being adjoined at both ends by phases in which the bridge is displaced solely by the rotation and the change in the length of the crane arm, is thus obtained. In this embodiment, too, it is, of course, necessary for the rotation of the crane about the vertical axis to be compensated by a corresponding rotation of the connecting head 12 so that during this displacement motion, too, the bridge 13 is always displaced parallel to itself along a rectilinear work path.

In all embodiments, it is, in principle, possible to adapt the work path to the given conditions. For example, if the apparatus is used on uneven terrain, an inclination of the work path can be taken into account. To do so, it is sufficient to reprogram the controlling of the crane motion accordingly. Such programming can be carried out, for example, manually by first displacing the bridge 13 manually along the desired work path and storing the respectively assumed crane positions. In a further operation, the stored data can then be used for controlling the bridge displacement.

A special advantage of the described construction is that the crane 3 can, of course, also be used to assemble and disassemble the apparatus, in particular, to load the bridge 13 onto the semi-trailer 1.

The semi-trailer 1 comprises alongside the crane 3 a loading surface 22 which is designed such that the bridge 13 can be loaded onto this loading surface. In this way, an independent treatment unit which does not rely on external supply means is obtained.

Figure 2:
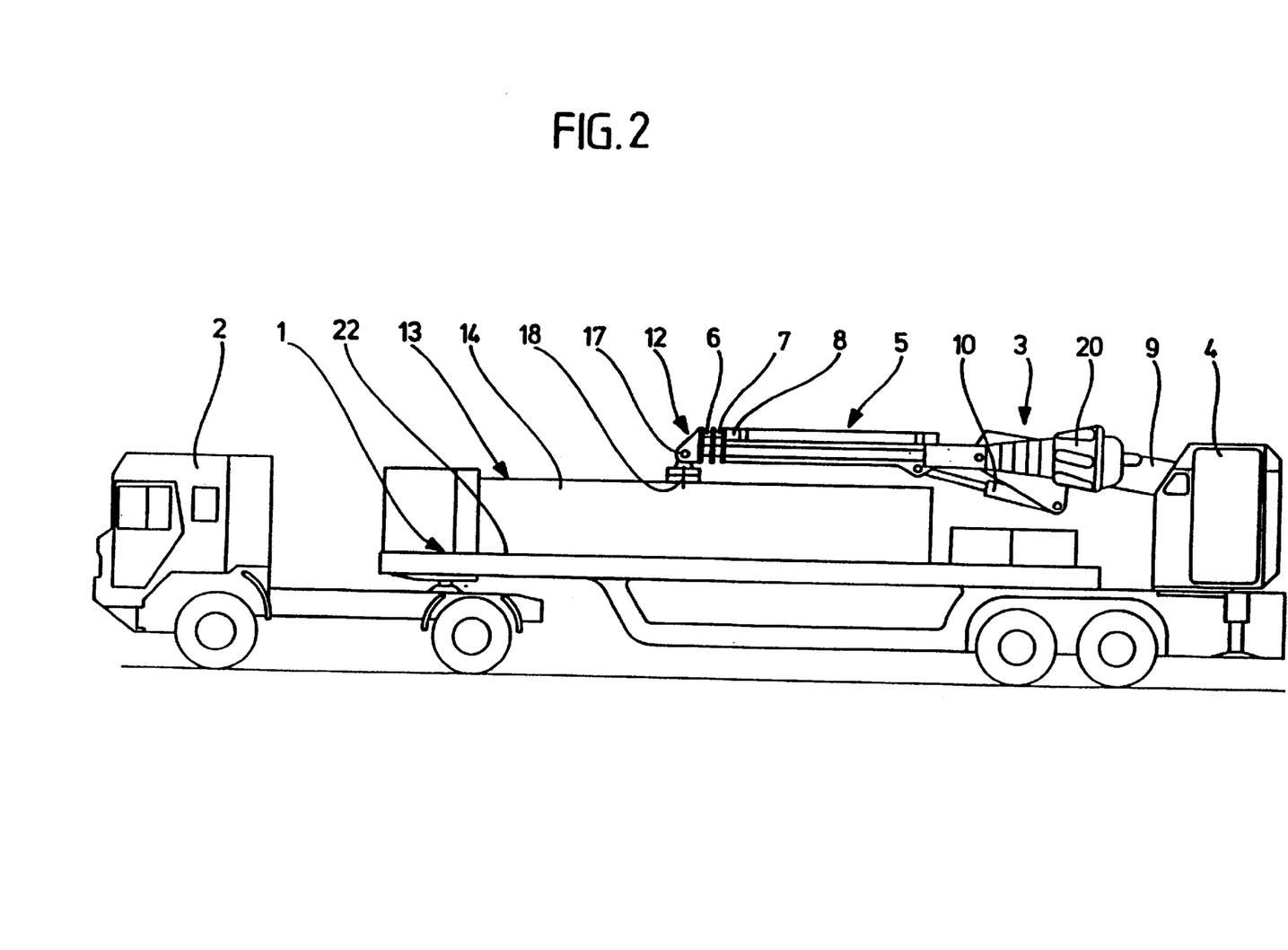
FIG. 2 a view of the vehicle of FIG. 1 with the bridge loaded onto the vehicle.

The side members 15 and 16 of the bridge 13 can be pivoted to a resting position in which the side members 15 and 16 are arranged parallel to the crossbeam 14. A compact package which can be deposited in a space-saving way on the loading surface 22 of the semi-trailer truck tractor 2, as illustrated in FIG. 2, is thereby obtained.

A preferred embodiment of a bridge 13 retractable in this way to a resting position will be explained in further detail hereinbelow with reference to FIGS. 7 to 13.

Figure 7:
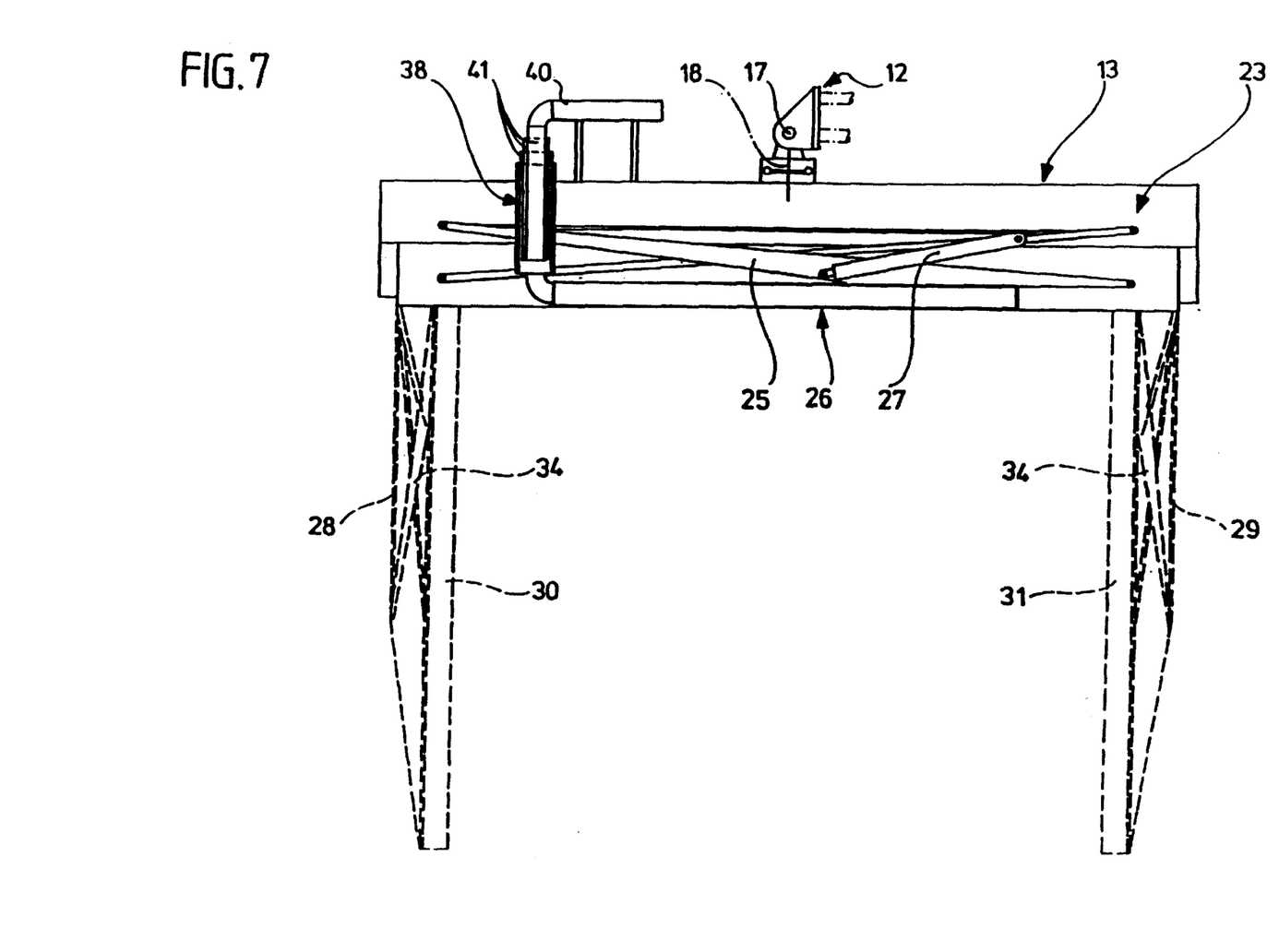
FIG. 7 a longitudinal sectional view of a bridge cut in the plane of the head beam with the head beam raised.
Figure 8:
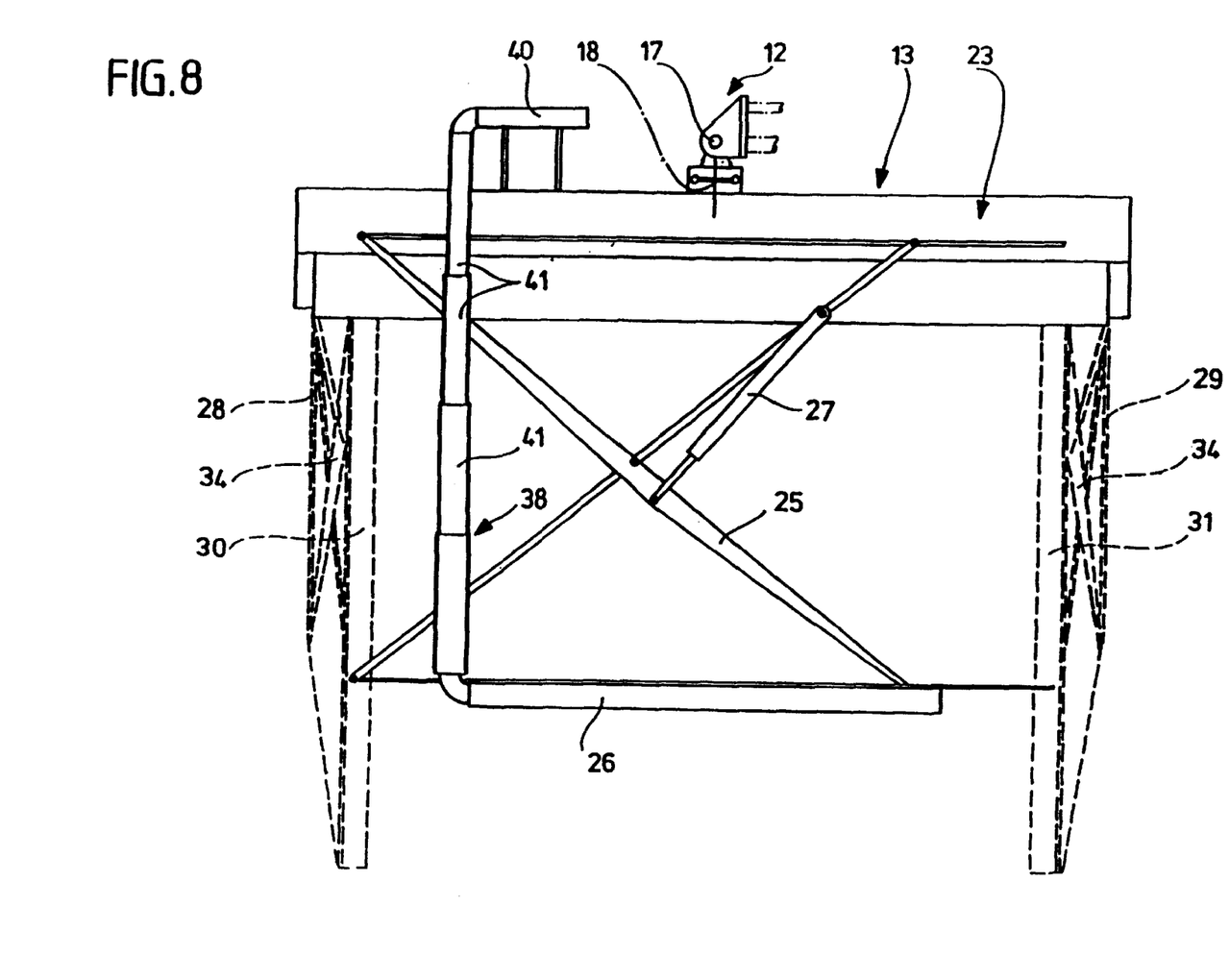
FIG. 8 a view similar to FIG. 7 with the head beam lowered.
Figure 9:
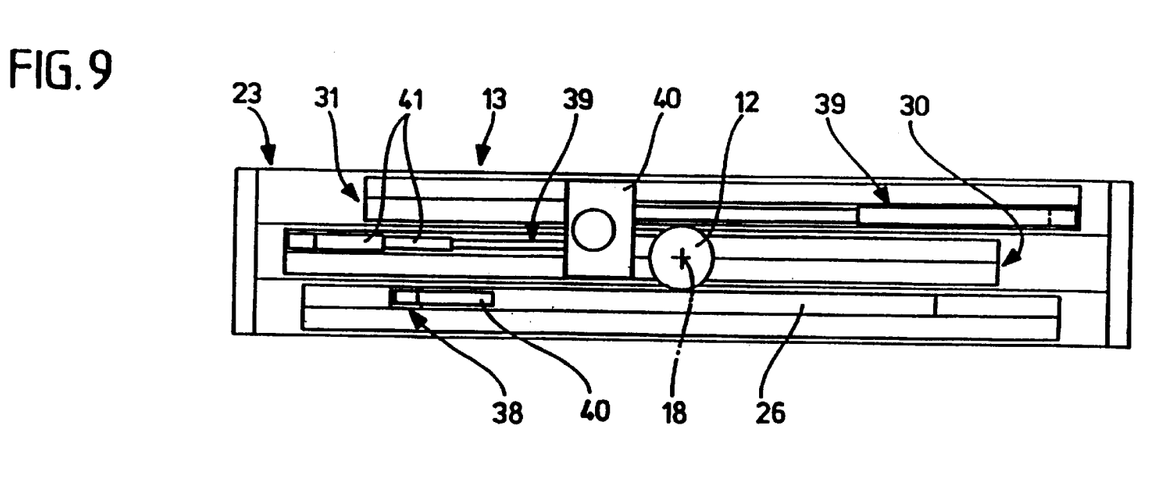
Figure 10:
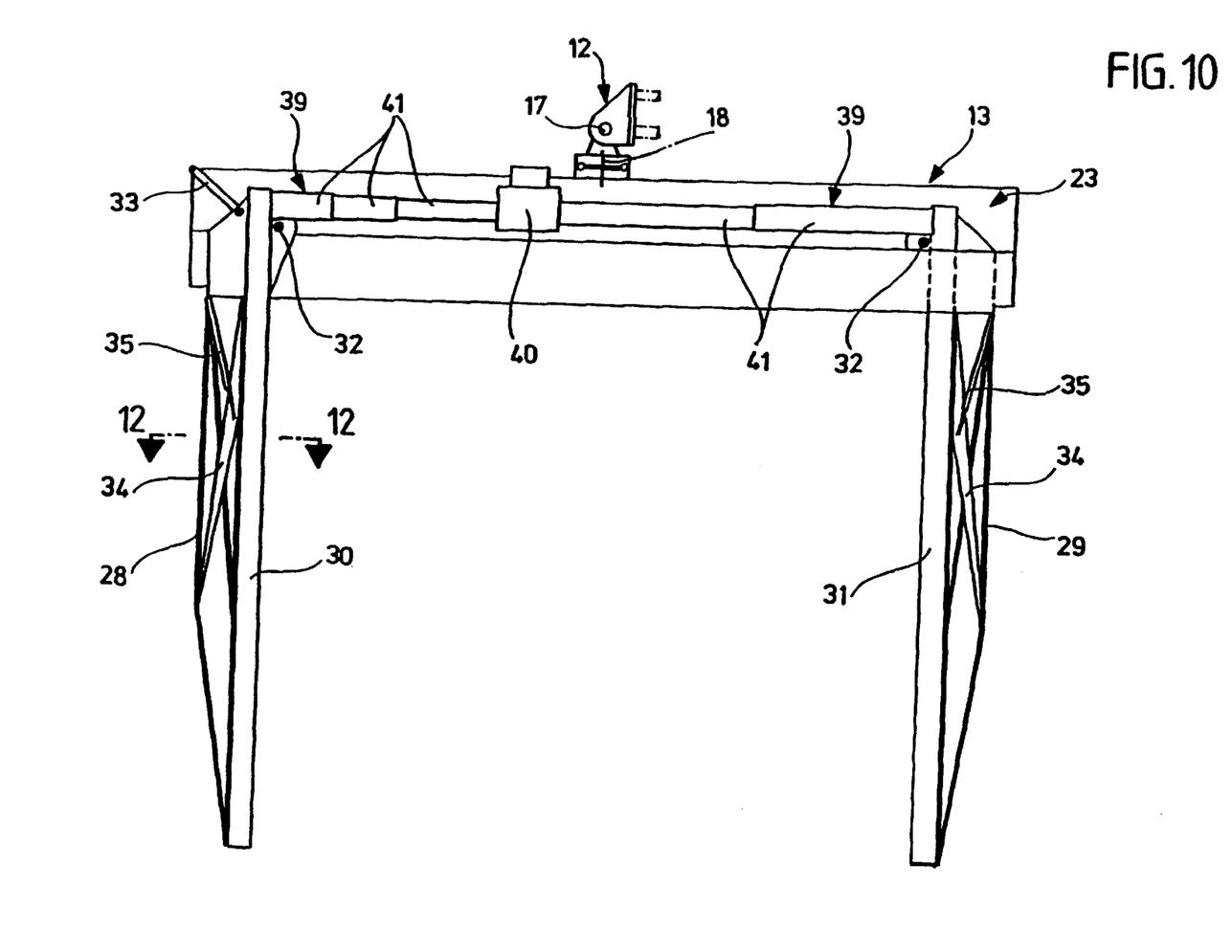
FIG. 10 a longitudinal sectional view of the bridge of FIG. 7 in the plane of a side beam with side beams pivoted out and driven out to the maximum extent.

The bridge 13 illustrated therein comprises a frame 23 which forms the crossbeam 14. In the illustrated embodiment, the frame 23 is of rectangular parallelepipedal design and is built up by individual struts 14 in grid-like or lattice-like construction. This frame 23 is connected at the center thereof to the connecting head 12 on which a horizontal head beam 26 is held via a scissors-type adjusting drive means 25. The scissors-type adjusting drive means 25 comprises a hydraulically actuatable piston cylinder unit 27 by means of which the scissors-type adjusting drive means can be folded together and pushed apart, as required, so that the horizontal head beam 26 is thereby lowered to a greater or lesser extent relative to the frame 23. In FIG. 7 the head beam 26 is shown in the raised, in FIG. 8 in the lowered position.

The adjusting drive means 25 and the head beam 26 have a width which is somewhat less than a third of the width of the frame 23, and they are arranged on a longitudinal side of this frame 23 so that there remains beside the adjusting drive means 25 and the head beam 26 a free space in the frame 23 in which two supports 28 and 29 and side beams 30 and 31, respectively, held thereon can be accommodated. The supports 28 and 29 and the side beams 30 and 31, respectively, are of identical construction, but are mirror-inverted. Therefore, the invention will essentially be explained hereinbelow with respect to one of the two supports and the side beam associated therewith.

Figure 11:
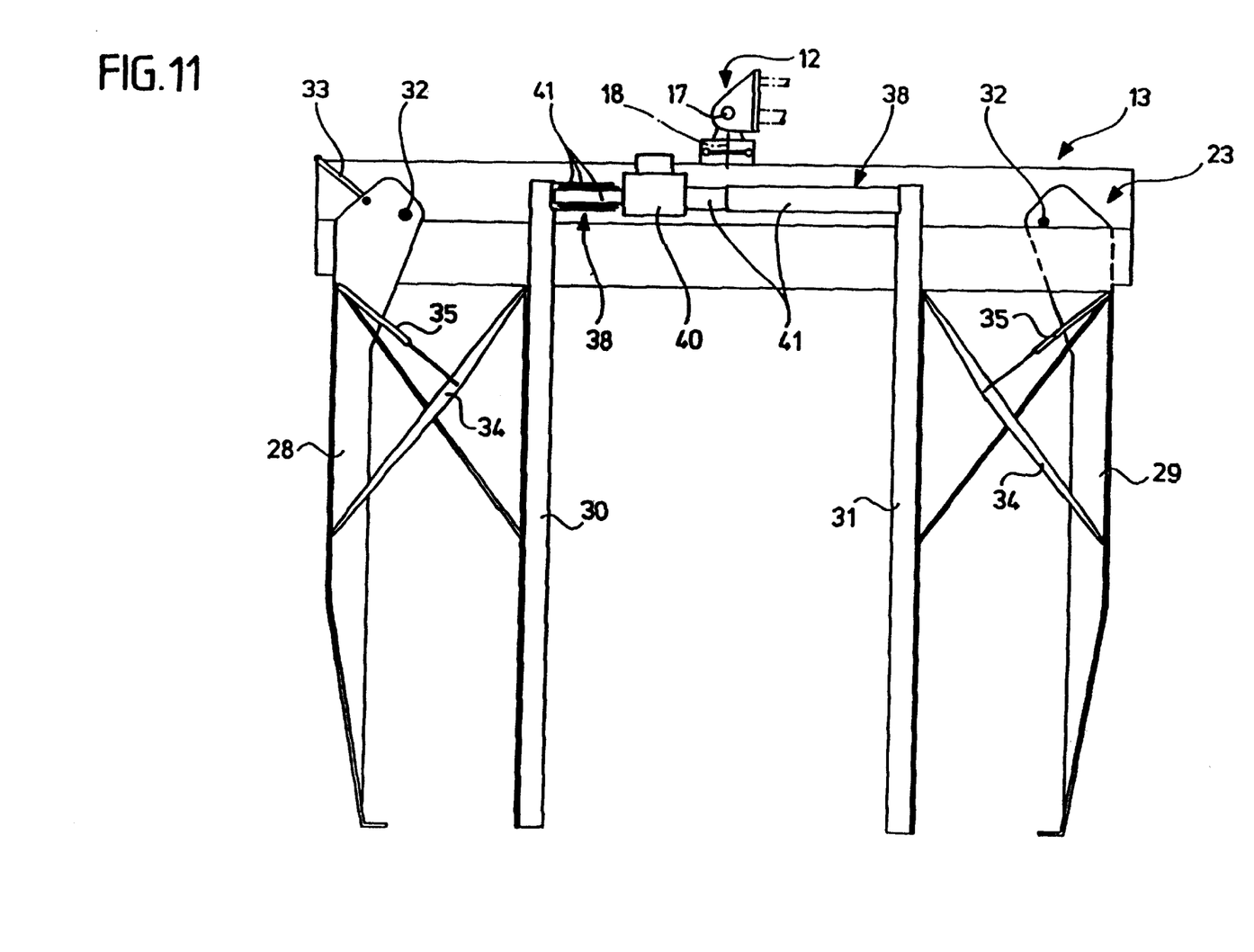
Figure 12:
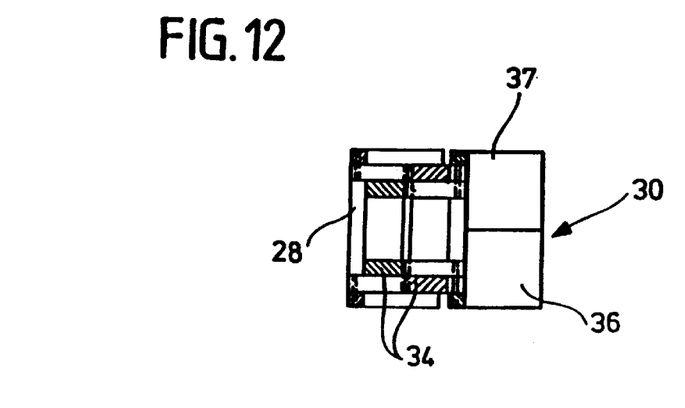
FIG. 12 a sectional view along line 12—12 in FIG. 10.
Figure 13:
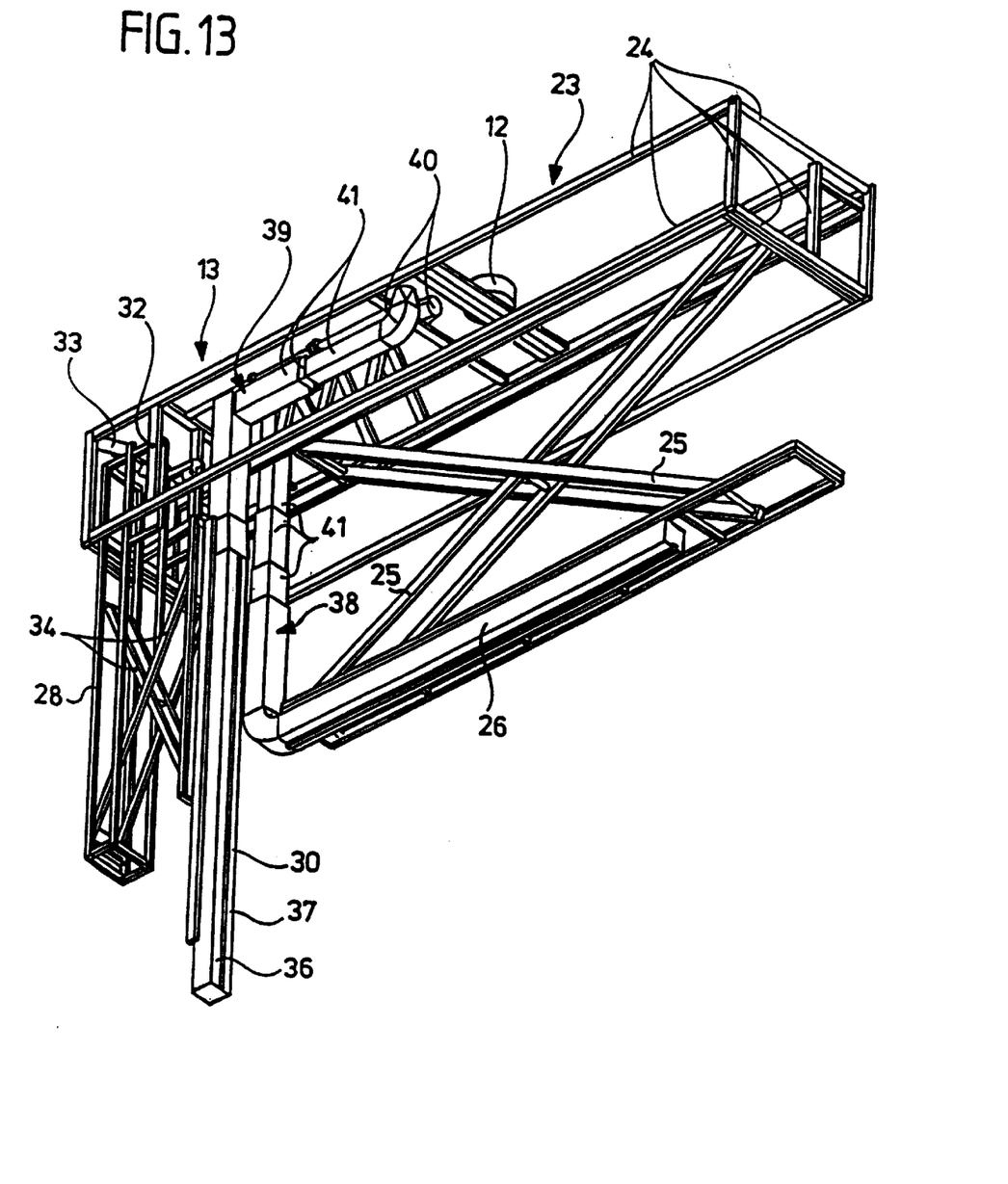
FIG. 13 a perspective view of a bridge with lowered head beam and partly driven in side beam, wherein only one side beam is illustrated for reasons of clarity.

As will be apparent, in particular, from the illustration in FIG. 11, the support 28 is mounted on the frame 23 for pivotal movement about an axis of rotation 32 extending transversely to the longitudinal axis of the frame 23. Engaging the support 28 is a piston cylinder unit 33 by means of which the support 28 is pivotable from a resting position, in which it is pivoted into the frame 23 and extends parallel to the head beam 26, to a working position in which it projects vertically downwards from the frame 23.

The support 28 is essentially of U-shaped cross section (FIG. 12) and accommodates a scissors-type adjustment device 34 having associated therewith a further piston cylinder unit 35 by means of which the scissors-type adjustment device 34 can be displaced between a retracted position (FIG. 10) and an extended position (FIG. 11). The side beam 30 which is held on the adjustment device 34 extends over the entire height of the support 28 and can be moved by the adjustment device 34 to positions which are spaced to a greater or lesser extent from the support 28.

In the working position, in which the support 28 and the side beam 30 are pivoted out of the frame 23, it is, therefore, possible to adjust the spacing between the two side beams 30 and 31 in the desired manner and, in addition, the head beam 26 can be lowered by adjustment to a greater or lesser extent relative to the frame 23. In this way, it is possible to change the size of the U-shaped interior of the bridge 13 formed by the two side beams and the head beam and thereby adapt it to a respective article 19 to be treated. Such an article 19 can, for example, be a vehicle, as indicated in FIG. 1. In FIGS. 7 to 11 the size of this article 19 is symbolized by a rectangle which essentially results from the edges of this rectangle maintaining a constant spacing from the head beam and the side beams.

Both the head beam 26 and the side beams 30 and 31 comprise two chambers 36 and 37 (FIG. 12) arranged alongside each other and extending over the entire length of the head beam and the side beams, respectively. The chamber 36 is a gas channel having along its length a number of openings, not illustrated in the drawings, for delivering a flow of gas which is directed at the article 19 to be treated. Each chamber 36 is connected via a supply line 38 and 39, respectively, to a connection 40 which is arranged on the frame 23 and to which the fan 20 is connectable. This fan can, for example, be a hot gas turbine. It is, however, in principle, possible to also supply other gases or vapors in the treating apparatus, and so the term "air supply" or "gas supply" is to be generally understood as supply of any gases or vapors.

The supply lines 38 and 39 each have an area with a larger number of sections 41 which can pushed into one another telescopingly. These areas always extend parallel to the direction of displacement of the respective beam and so a change in the length of the supply lines 38 and 39, respectively, which corresponds to the respective position of the head beam 26 and the side beams 30 and 31, respectively, is achieved by telescope-type, sealed-off pushing of the sections 41 one within another.

Supply lines for liquid agents are laid in the chambers 37. These are not illustrated in the drawings. These liquid agents can be any kind of cleaning and treating liquid, for example, water, cleaning chemicals, conservation chemicals, decontaminating chemicals, etc., and all these chemicals can be applied diluted or undiluted, as required, for example, also in the form of foams, etc. The chambers 37 have, for this purpose, discharge openings which are distributed over their length, but which are likewise not illustrated in the drawings. These can be, for example, stationary or rotating compact-spray or flat-spray nozzles, foam-discharging nozzles, etc. The supply lines for liquid agents can be connected via flexible hoses to the frame 23 and lead from there via the crane arm 5 to supply devices on the semi-trailer 1.

For transportation purposes, the bridge 13 is in the resting position, i.e., the supports 28 and 29 with the side beams 30 and 31 are pivoted into the frame 23, and the side beams 30 and 31 are then in the position drawn closest to the supports 28 and 29, respectively. Also the head beam 26 is completely raised and driven into the frame 23. The frame 23 thus fully accommodates the head beam 26 and the side beams 30 and 31 with their adjustment devices and forms a rectangular parallelepipedal package in which the entire bridge is located. This unit lies on the loading surface 22 of the semi-trailer 1 (FIG. 2) and is connected to the crane arm 5 via the connecting head 12.

For operation of the bridge, this package is lifted off the loading surface 22 by the crane 3 and pivoted out into a position, as illustrated, for example, in FIG. 1. The two supports 28 and 29 are then pivoted out downwardly by the piston cylinder units 33. In FIG. 7, the bridge is illustrated in its resting position in solid lines, the downwardly pivoted out supports and side beams are shown in broken lines. Once this pivoting out has taken place, the bridge 13 is in the working position. For adaptation to the size of the article to be treated, the head beam 26 is then lowered and the side beams 30 and 31 are driven in by the adjusting drive means 25 and 34. For treatment of the article, the bridge is then driven in the described manner along its work path by the crane.

After completion of the treatment operation, the bridge is retracted again in the reverse way and loaded onto the semi-trailer 1 so as to produce an overall compact transportation unit which can be put into operation again in a simple way at any chosen location, more particularly, without any extensive preparation work, as the bridge 13 preferably remains connected to the crane arm 5 also in the loaded state. The unloading operation can, therefore, be performed quickly, and also the unfolding of the bridge and the adaptation to the size of the article to be treated can be carried out rapidly and without delay.

What is claimed is:

1. Apparatus for treating an article, comprising:
   a U-shaped treatment bridge with a head beam arranged above the article;
   two side beams arranged at the sides of said article and extending transversely to said head beam; and
   delivery devices arranged on at least one of said beams for respectively directing at least one treating agent at said article; wherein:
   both of said side beams of said bridge are pivotable from a working position, in which they stand transversely to said head beam, to a resting position, in which they are arranged parallel to said head beam so that said bridge is foldable in a space-saving manner into a transportable package; and
   said side beams and said head beam are offset in relation to one another transversely to a longitudinal direction of said head beam so that said side beams and said head beam lie alongside one another in the resting position.

2. Apparatus as defined in claim 1, wherein:
   said side beams are mounted on said bridge for adjustment in the longitudinal direction of said head beam in the working position.

3. Apparatus as defined in claim 1, wherein:
   said bridge comprises a frame on which said head beam and said side beams are mounted.

4. Apparatus as defined in claim 1, wherein:
   said head beam is connected to a fan via a gas supplying channel which is of variable length.

5. Apparatus as defined in claim 4, wherein:
   said gas supplying channel is formed in its area of variable length by pipe sections guided telescopingly one within the other.

6. Apparatus for treating an article, comprising:
   a U-shaped treatment bridge with a head beam arranged above the article;
   two side beams arranged at the sides of said article and extending transversely to said head beam; and
   delivery devices arranged on at least one of said beams for respectively directing at least one treating agent at said article; wherein:
   both of said side beams of said bridge are pivotable from a working position, in which they stand transversely to said head beam, to a resting position, in which they are arranged parallel to said head beam so that said bridge is foldable in a space-saving manner into a transportable package; and
   said head beam is mounted for vertical adjustment on said bridge.

7. Apparatus as defined in claim 6, wherein:
   said bridge comprises a frame on which said head beam and said side beams are mounted.

8. Apparatus for treating an article, comprising:
   a U-shaped treatment bridge with a head beam arranged above the article;
   two side beams arranged at the sides of said article and extending transversely to said head beam; and
   delivery devices arranged on at least one of said beams for respectively directing at least one treating agent at said article; wherein:
   both of said side beams of said bridge are pivotable from a working position, in which they stand transversely to said head beam, to a resting position, in which they are arranged parallel to said head beam so that said bridge is foldable in a space-saving manner into a transportable package;
   said side beams are mounted on said bridge for adjustment in a longitudinal direction of said head beam in the working position;
   said side beams are connected to a fan via a gas supplying channel which is of variable length; and
   said gas supplying channel is formed in its area of variable length by pipe sections guided telescopingly one within the other.

9. Apparatus for treating an article, comprising:

a U-shaped treatment bridge with a head beam arranged above the article;

two side beams arranged at the sides of said article and extending transversely to said head beam; and delivery devices arranged on at least one of said beams for respectively directing at least one treating agent at said article; wherein:

both of said side beams of said bridge are pivotable from a working position, in which they stand transversely to said head beam, to a resting position, in which they are arranged parallel to said head beam so that said bridge is foldable in a space-saving manner into a transportable package;

said bridge comprises a frame on which said head beam and said side beams are mounted; and said frame accommodates said head beam, and said side beams in their resting position.

10. Apparatus for treating an article, comprising:

a U-shaped treatment bridge with a head beam arranged above the article;

two side beams arranged at the sides of said article and extending transversely to said head beam; and delivery devices arranged on at least one of said beams for respectively directing at least one treating agent at said article; wherein:

both of said side beams of said bridge are pivotable from a working position, in which they stand transversely to said head beam, to a resting position, in which they are arranged parallel to said head beam so that said bridge is foldable in a space-saving manner into a transportable package;

said bridge comprises a frame on which said head beam and said side beams are mounted; and said head beam is designed for vertical adjustment on said frame by an associated adjusting drive means.

11. Apparatus as defined in claim 10, wherein:

said side beam is adjustably mounted on said support such that its spacing from said support is alterable via an associated adjusting drive means; and at least one of (a) said adjusting drive means of said head beam, and (b) said adjusting drive means of said side beams, comprise scissors-type rod mechanisms.

12. Apparatus for treating an article, comprising:

a U-shaped treatment bridge with a head beam arranged above the article;

two side beams arranged at the sides of said article and extending transversely to said head beam; and delivery devices arranged on at least one of said beams for respectively directing at least one treating agent at said article; wherein:

both of said side beams of said bridge are pivotable from a working position, in which they stand transversely to said head beam, to a resting position, in which they are arranged parallel to said head beam so that said bridge is foldable in a space-saving manner into a transportable package;

a support which is pivotally mounted on said bridge is associated with each side beam;

said support is pivotally mounted on said frame; and said side beam is adjustably mounted on said support such that its spacing from said support is alterable via an associated adjusting drive means.

13. Apparatus is defined in claim 12, wherein:

said head beam is designed for vertical adjustment on said frame by an associated adjusting drive means; and at least one of (a) said adjusting drive means of said head beam, and (b) said adjusting drive means of said side beams, comprise scissors-type rod mechanisms.

14. Apparatus for treating an article, comprising:

a U-shaped treatment bridge with a head beam arranged above the article;

two side beams arranged at the sides of said article and extending transversely to said head beam; and delivery devices arranged on at least one of said beams for respectively directing at least one treating agent at said article; wherein:

both of said side beams of said bridge are pivotable from a working position, in which they stand transversely to said head beam, to a resting position, in which they are arranged parallel to said head beam so that said bridge is foldable in a space-saving manner into a transportable package;

a support which is pivotally mounted on said bridge is associated with each side beam; and said side beam is adjustably mounted on said support such that its spacing from said support is alterable via an associated adjusting drive means.

15. Apparatus for treating an article, comprising:

a U-shaped treatment bridge with a head beam arranged above the article;

two side beams arranged at the sides of said article and extending transversely to said head beam; and delivery devices arranged on at least one of said beams for respectively directing at least one treating agent at said article; wherein:

both of said side beams of said bridge are pivotable from a working position, in which they stand transversely to said head beam, to a resting position, in which they are arranged parallel to said head beam so that said bridge is foldable in a space-saving manner into a transportable package; and said head beam and/or said side beams comprise two parallel chambers extending over the length thereof, one chamber being connected to a fan and having gas outlet openings, and supply lines for liquid agents leading to outlet openings for the liquid agents running in the other chamber.

* * * * *